(12) United States Patent
Dworatzek et al.

(10) Patent No.: US 7,744,758 B2
(45) Date of Patent: Jun. 29, 2010

(54) LIQUID FILTER (75) Inventors: Klemens Dworatzek, Edingen (DE); Ralf Bauder, Ketsch (DE); Karlheinz Muenkel, Oberderdingen-Flehingen (DE); Duc Cuong Nguyen, Laatzen (DE)

(73) Assignee: Mann + Hummel GmbH, Ludwigsburg (DE)

( * ) Notice: Subject to any disclaimer, the term of this patent is extended or adjusted under 35 U.S.C. 154(b) by 11 days.

(21) Appl. No.: 11/354,161

(22) Filed: Feb. 15, 2006

(65) Prior Publication Data

US 2006/0191836 A1 Aug. 31, 2006

Related U.S. Application Data

(60) Provisional application No. 60/666,190, filed on Mar. 30, 2005.

(30) Foreign Application Priority Data

Feb. 15, 2005 (DE) .................. 10 2005 007 018

(51) Int. Cl.
*B01D 35/153* (2006.01)
*B01D 35/00* (2006.01)
(52) U.S. Cl. .................. 210/235; 210/234; 210/136; 210/440
(58) Field of Classification Search .................. None
See application file for complete search history.

(56) References Cited

U.S. PATENT DOCUMENTS

| | | | | |
|---|---|---|---|---|
| 3,231,089 A * | 1/1966 | Thornton | | 210/136 |
| 3,363,762 A * | 1/1968 | Ensign | | 210/136 |
| 3,369,666 A * | 2/1968 | Hultgren et al. | | 210/130 |
| 3,912,631 A * | 10/1975 | Turman | | 210/136 |
| 4,878,516 A * | 11/1989 | Mathieu | | 137/240 |
| 5,182,015 A * | 1/1993 | Lee | | 210/136 |
| 5,350,506 A * | 9/1994 | Dombek et al. | | 210/136 |
| 5,405,527 A * | 4/1995 | Covington | | 210/136 |
| 5,560,824 A * | 10/1996 | Sann et al. | | 210/234 |
| 5,667,599 A | 9/1997 | Rungta et al. | | |
| 5,707,356 A * | 1/1998 | Paul | | 604/119 |
| 6,568,540 B1 * | 5/2003 | Holzmann et al. | | 210/445 |

(Continued)

FOREIGN PATENT DOCUMENTS

DE 18 54 437 U 7/1962

(Continued)

OTHER PUBLICATIONS

European Search Report dated Apr. 18, 2007 with an English translation of the pertinent portions (Eight (8) pages).

(Continued)

*Primary Examiner*—Krishnan S Menon
*Assistant Examiner*—Madeline Gonzalez
(74) *Attorney, Agent, or Firm*—James Hasselbeck (57) ABSTRACT

A liquid filter, especially oil filter for an internal combustion engine, having a cup-shaped housing with a liquid inlet and a liquid outlet, a filter element arranged with a seal between the inlet and outlet, and a one-piece barrier membrane arranged in the area of the opening of the cup-shaped housing such that the liquid inlet and/or the liquid outlet can be closed by the barrier membrane.

13 Claims, 7 Drawing Sheets

U.S. PATENT DOCUMENTS

| | | | |
|---|---|---|---|
| 6,936,162 B1 * | 8/2005 | McKenzie | 210/130 |
| 2003/0196939 A1 | 10/2003 | Binder et al. | |
| 2006/0113227 A1 * | 6/2006 | Mckenzie | 210/130 |

FOREIGN PATENT DOCUMENTS

| | | |
|---|---|---|
| DE | 75 04 574 U | 6/1975 |
| DE | 41 40 140 A1 | 6/1993 |
| DE | 42 01 041 A1 | 7/1993 |
| DE | 43 10 492 A1 | 10/1994 |
| DE | 295 09 806 U1 | 10/1995 |
| DE | 196 41 369 A1 | 4/1998 |
| DE | 100 46 494 A1 | 7/2001 |
| DE | 100 35 555 A1 | 1/2002 |
| EP | 1 508 353 A1 | 2/2005 |
| WO | WO 97/44115 A1 | 11/1997 |

OTHER PUBLICATIONS

German Search Report dated Oct. 28, 2005 including English translations of relevant portion (Five (5) pages).

* cited by examiner

Fig.9 and can be adapted to the prevailing pressure conditions by a slight change in the composition of the plastic or through design measures.
LIQUID FILTER

BACKGROUND OF THE INVENTION

The present invention relates to a liquid filter according to the preamble of Patent Claim 1.

Known liquid filters often include barrier membranes and non-return valves to prevent liquid from flowing back out of the filter when the internal combustion engine is stopped. Such devices also prevent the liquid from flowing out of the filter when the filter is replaced.

Published German Patent application no. DE 41 40 140 describes a screw-on filter for liquids, in particular a lubricating oil filter for an internal combustion engine. Such a filter has a peripheral barrier membrane in the area of the liquid inlet which achieves the sealing function via a peripheral lip which fits sealingly against a cover plate of the replaceable filter. In addition, a non-return valve consisting of a cage, a spring arranged in the cage, and a valve body acted upon by the spring with spring force is mounted centrally in the interior of the filter medium, with a sealing fit being established between the valve body and the cage.

However, it is a disadvantage of this arrangement that many different parts are needed for the functioning of the non-return valve and the barrier membrane, and these parts are manufactured from different materials.

SUMMARY OF THE INVENTION

It is therefore an object of the present invention to provide an improved liquid filter with a non-return valve feature.

Another object of the invention is to provide a liquid filter which is particularly suitable for filtering lubricating oil of an internal combustion engine but which also may be used for other purposes.

A further object of the invention is to provide a liquid filter having a non-return valve with reduced design complexity and simpler structure than prior art liquid filters with similar capabilities.

It is also an object of the invention to provide a liquid filter with a combination barrier membrane and non-return valve.

These and other objects are achieved in accordance with the present invention by providing a liquid filter comprising a cup-shaped housing with a liquid inlet and a liquid outlet; a filter element sealingly disposed in said housing between the inlet and the outlet, and a one-piece barrier membrane disposed adjacent the opening of the cup-shaped housing so that the liquid inlet and the liquid out can be closed by the barrier membrane.

The liquid filter of the invention, in particular an oil filter for an internal combustion engine, comprises a cup-shaped housing having a liquid inlet and a liquid outlet, and a filter element arranged with a seal between the inlet and outlet. A one-piece barrier membrane is situated in the area of the opening in the cup-shaped housing, where the liquid inlet and/or the liquid outlet can be closed by the barrier membrane such that:
- when the filter is inserted and the internal combustion engine is running, the inlet and outlet are opened by the barrier membrane;
- when the internal combustion engine is stopped and the filter element is inserted, either the inlet and outlet are closed or only the inlet is closed, and
- when the filter is removed, the inlet and outlet are again closed.

The liquid filter may be designed as a spin-on filter or as an oil module. The housing may be made of a metallic material or synthetic resin material and the filter element may be made of filter paper or a synthetic material having accordion pleating, coils or alternately sealed channels through which liquid flows from one axial end to the other. This results in an extremely space-saving embodiment of the non-return valve as a membrane and the filter may have a very compact design.

In addition, the membrane can be manufactured much less expensively and more easily than a spring-loaded basket valve. A filter of this type may be used when there are liquids in the area of an internal combustion engine, such as oil, fuel or water. However, applications outside of internal combustion engines, e.g., in water processing systems, are also conceivable.

According to one advantageous embodiment of this invention, the filter element is in the form of a hollow cylinder having an end disk at least in the area of the opening in the cup-shaped housing, and the barrier membrane is detachably or non-detachably connected to the end disk. As used herein, the term "detachably connected" means that the parts can be separated non-destructively, i.e., without rendering them unsuitable for further use if reattached. The term "non-detachably connected" means that the parts cannot be separated without damaging at least one of them so that it is not suitable for further use.

A non-detachable connection may be established by adhesive bonding, fusion welding or by other non-detachable joining methods known in the art. This has the advantage that, among other things, each time the filter element is changed, the barrier membrane is also replaced and therefore there is no decline in barrier function over the entire lifetime of the liquid filter system.

In accordance with an alternative embodiment of the invention, the barrier membrane is correspondingly connected detachably or non-detachably to a cover plate of the filter. In the case of a spin-on filter, the cover plate may be understood to be, for example, the hollow cylindrical closure on the cup-shaped housing which includes the connecting device for attaching the filter to a connecting head. In addition, the cover plate may be a component located in the area of the connection between the filter element and a connecting head independently of end disks present on the filter element.

Alternatively, it is also possible for the barrier membrane to be correspondingly attached detachably or non-detachably to a support tube. In many applications, it is known to provide filter elements constructed in the form of a hollow cylinder with a support tube in the interior of the filter element to prevent the filter element from collapsing when there are pressure pulsations. The barrier membrane can be correspondingly attached to the support tube via a detachable or non-detachable connecting method. The non-detachable connecting methods described above may, of course, also be used for all three alternative embodiments. Similarly, the detachable connecting methods usable to attach the barrier membrane (for example, with connectors, clips or clamps) so that it can be detached in a non-destructive manner, are also applicable to all three embodiments.

In accordance with an advantageous embodiment of the present invention, the barrier membrane is made of a thermoplastic elastomer (TPE). This choice of materials yields the advantage of making it possible to work with a flexible membrane having an inherent elasticity. This membrane can be manufactured easily and inexpensively by injection molding and can be adapted to the prevailing pressure conditions by a slight change in the composition of the plastic or through design measures.

Alternatively, the barrier membrane may also be made of a two-component synthetic resin material, where the softer component is used for the sealing function and the harder component is used for the connecting contour to the end disk, the cover plate or the support tube.

It is advantageous if the barrier membrane comprises a circular connecting plate with a first barrier arranged on its outer edge. In addition, the connecting plate has a concentric second barrier arranged in the radially inside area. The first barrier may be constructed, for example, as a flexible elastic sealing face arranged at an angle to the connecting plate, and the second barrier may be constructed as a flexible tube continuation from the circular connecting plate, with the tube having a duckbill shape toward the end thereof in order to effect a seal.

In accordance with another embodiment of the present invention, the circular connecting plate of the barrier membrane is provided with connecting elements for detachably connecting the membrane to an end disk of the filter element, or to the cover plate, or to the support tube. This may be accomplished, for example, through apertures which are engaged with special connector profiles formed on the end disk, the cover plate or the support tube, or through connecting clips, clamps or a detent mechanism.

In the return flow barrier state, i.e., in the closed state, the first return flow barrier is advantageously in sealing contact against a concentric sealing contour arranged radially outwardly thereof. This sealing contour may be formed, for example, by another end disk, a sealing contour formed from the housing or a sealing contour formed on a cover plate on the filter.

The functions of the barrier membrane and the non-return valve of the prior art are thus assumed by the one-piece barrier membrane and greatly simplified. This results in significant cost savings and optimum utilization of design space.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
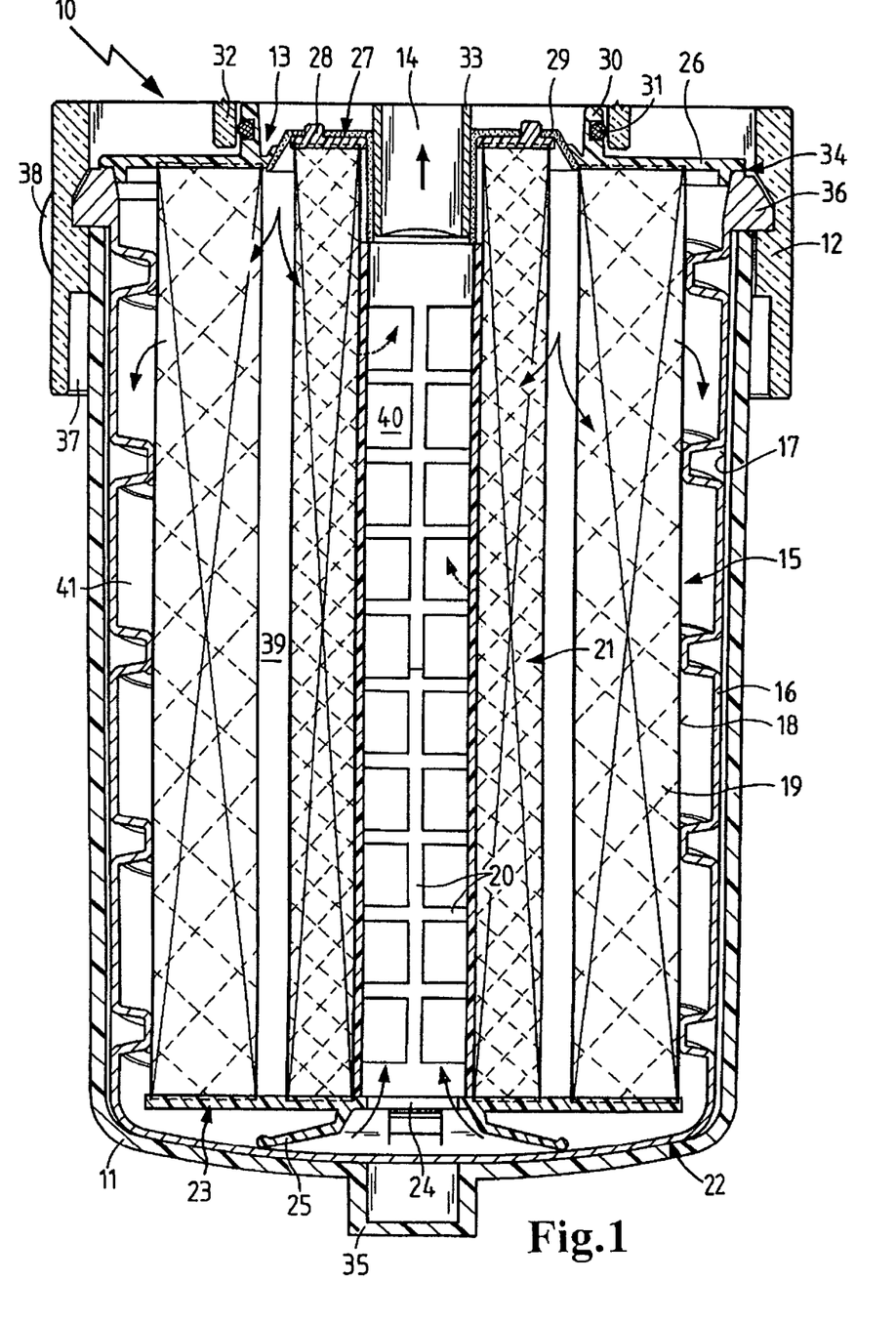
FIG. 1 is a sectional diagrammatic view a liquid filter system according to the present invention.

FIG. 1 is a sectional diagram of a liquid filter system 10, in which a cup-shaped housing 11 is connected by a bayonet connection to a connecting head 12. The connecting head may be a separate connecting flange or it may be formed directly from a component of an internal combustion engine. The filter system may be used, for example, for liquids of any type associated with an internal combustion engine, such as oils, fuels, hydraulic liquids or coolants.

An inlet 13 and an outlet 14 are provided in the connecting head 12 of the filter system 10. The outlet 14 is arranged concentrically at the center of the connection between the cup-shaped housing 11 and the connecting head 12, and the inlet 13 is arranged concentrically around the outlet 14, likewise being arranged in the interior of the connection between the cup-shaped housing 11 and the connecting head 12.

A filter element 15 is arranged in the cup-shaped housing 11. The illustrated filter element 15 comprises a canister 16 which holds the filter medium or media. The outer periphery of canister 16 is supported radially outwardly against the inside wall 17 of the cup-shaped housing 11. Simultaneously, grooves formed in the wall of the canister 16 provide support for the outer periphery of a first filter bellows 19 disposed within the canister. The canister 16 is designed to be liquid-tight and also has the function of an outer support tube for a first filter bellows and a support with respect to pressure pulsations on the cup-shaped housing 11. The canister 16 may therefore be designed to have a relatively small material thickness because it is actually supported against the cup-shaped housing 11, depending on the pressure pulsation.

A support tube 20 is arranged concentrically in the interior of the filter element with a second filter bellows 21 extending around the support tube. The first and second filter bellows may be formed by a filter medium having zigzag pleating, by a coiled filter medium, a combination of the two or some other filter bellows known from the state of the art. In the area of the housing bottom 22 of the canister 16, the two filter bellows are held by an end disk 23 constructed in the form of a circular ring with a concentric opening 24.

A spring element 25 is formed in one piece from the end disk 23, supporting the filter bellows on the housing bottom 22 and secured and fixed axially by applying a spring force acting axially upward. The axial securing and fixation are accomplished through the inside contour of the canister 16. On the opposite end of the filter bellows, the first filter bellows 19 have an end disk seal 26.

The second filter bellows 21 arranged in the interior of the first filter bellows 19 has a slightly greater axial length than the first filter bellows 19, and the end closure of the second filter bellows 21 is accomplished via an end disk 27 having a circular shape forming a concentric passage for the outlet 14. The end disk 27 has a connecting element 28 for a barrier membrane 29 axially in the direction of the connecting head 12. The connecting element 28 is distributed over the end disk 27 and comprises a plurality of pins or mushroom-shaped contours protruding axially in the direction of the connecting head 12. The barrier membrane 29 is fastened tightly onto the end disk 27 by the connecting element 28, sealing the liquid inlet 13 on the one hand when the internal combustion engine is stopped and also in the event of maintenance sealing the liquid outlet 14. The barrier membrane 29 is preferably made of a soft thermoplastic material such as a thermoplastic elastomer (TPE).

End disk 26 has a annular collar 30 protruding axially and concentrically, with a groove arranged on the outer circumference of the collar to accommodate a sealing ring 31. The annular collar 30 is inserted into a collar receptacle 32 on the connecting head when the cup-shaped housing 11 and the connecting body 12 are attached to each other. The sealing ring 31 serves to provide a seal between the annular collar 30 and the collar receptacle 32.

Situated concentrically in the interior of the collar receptacle 32 is an outlet pipe 33, which is inserted into the opening of the end disk 27 and opens the return flow barrier of the barrier membrane 29 on the outlet side. To provide a seal between the unfiltered liquid side of the filter and the clean side, the gasket here is arranged radially between the barrier membrane 29 and the outlet pipe 33, which is in turn situated in the connecting head 12. In order to achieve a liquid-tight seal of the filter element 15, the canister 16 and the end disk 26 are non-detachably joined with a seal via a connecting contour 34, e.g., by a fusion welding method or an adhesive bonding method.

To release the cup-shaped housing 11 for the purpose of maintenance and to thereafter reconnect the housing 11 to the connecting head 12, the cup-shaped housing 11 is provided with a tool engaging member 35 which may comprise either a hexagonal socket or a hexagonal plug. To perform maintenance, a wrench or other tool is engaged here to turn the cup-shaped housing 11 in order to separate it from the connecting head 12 or to reattach the housing to the connecting head.

From the one axial end of the canister 16, a plurality of catch element parts 36 are constructed in the form of radially outwardly extending noses distributed around the circumference. Catch element parts 36 engage in recesses in the cup-shaped housing and recesses within a catch contour on the cup-shaped housing 11, which are shown in the following figures. Catch element parts 36 of the canister 16 also simultaneously function as a connecting contour 34 to the end disk 26.

Figure 7:
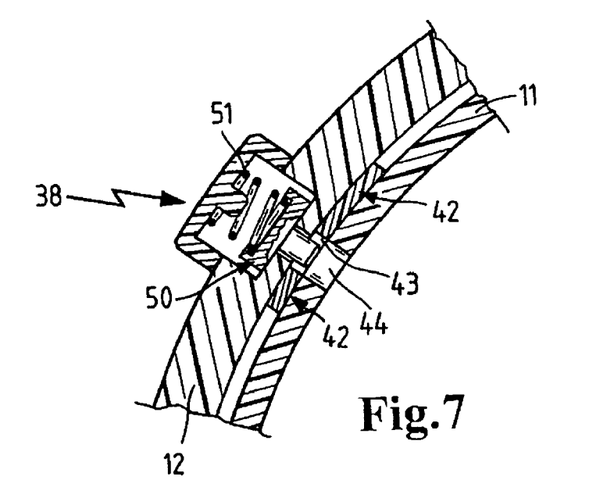
FIG. 7 is a top plan view of the section in the area of the blocking device.

The connecting head 12 is provided with guides 37 in which catch contours, formed from the catch element parts 36 of the canister 16 and from catch elements of the cup-shaped housing 11, can be inserted and guided. At least one blocking element 38 is provided in the outer area of the connecting head 12, preventing a connection between the cup-shaped housing and the connecting head 12 when no filter element 15 is installed or when a wrong filter element has been installed. In such a case, the blocking element 38 engages in a recess 44 in the cup-shaped housing 11 and thus prevents the bayonet closure from closing. FIG. 7 shows the operation of the blocking element 38.

The liquid to be cleaned flows through the inlet 13 of the connecting head 12 into an intermediate space 39 between the two filter bellows 19, 21, flowing through the inner second filter bellows 21 into a discharge chamber 40 on the clean side within the support tube 20, then flowing back through the barrier membrane 29 opened by the outlet tube 33 and through the outlet 14 on the clean side back into the liquid system. Starting from the intermediate space 39, another part of the liquid that has not yet been cleaned flows radially outwardly through the outer or first filter bellows 19 into a volume on the canister end in which it flows downward to the housing bottom 22 and from there can be returned back to the system through the outlet 14 on the clean side.

Figure 2:
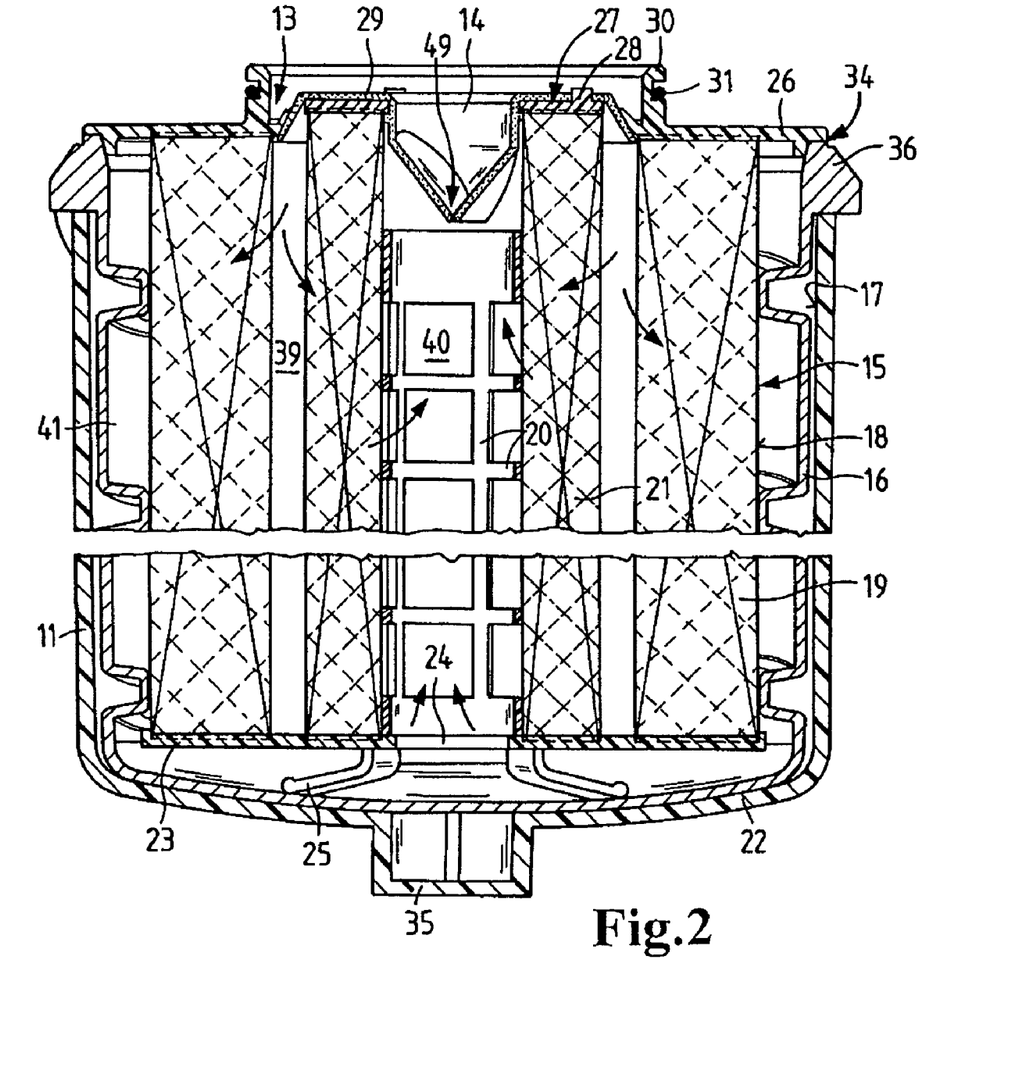
FIG. 2 is a sectional view through the filter element and the cup-shaped housing.

FIG. 2 shows the combination of filter element 15 and cup-shaped housing 11 in a sectional view. The components corresponding to the previous figure are identified by the same reference numerals. It can be seen here that with the cup-shaped housing 11 including the filter element 15 detached from the connecting head 12, the barrier membrane 29 has reverted back to its original shape in the area of the outlet 14 on the clean side due to the outlet tube 33 which is no longer present, so that the liquid stored in the filter element 15 is prevented from flowing out of the filter. Due to the construction of the barrier membrane 29 as a thermoplastic elastomer, a restoring force can be induced within the barrier membrane due to the contour, and results in a seal on the outlet end which is tightly sealed by the restoring force alone.

Figure 3:
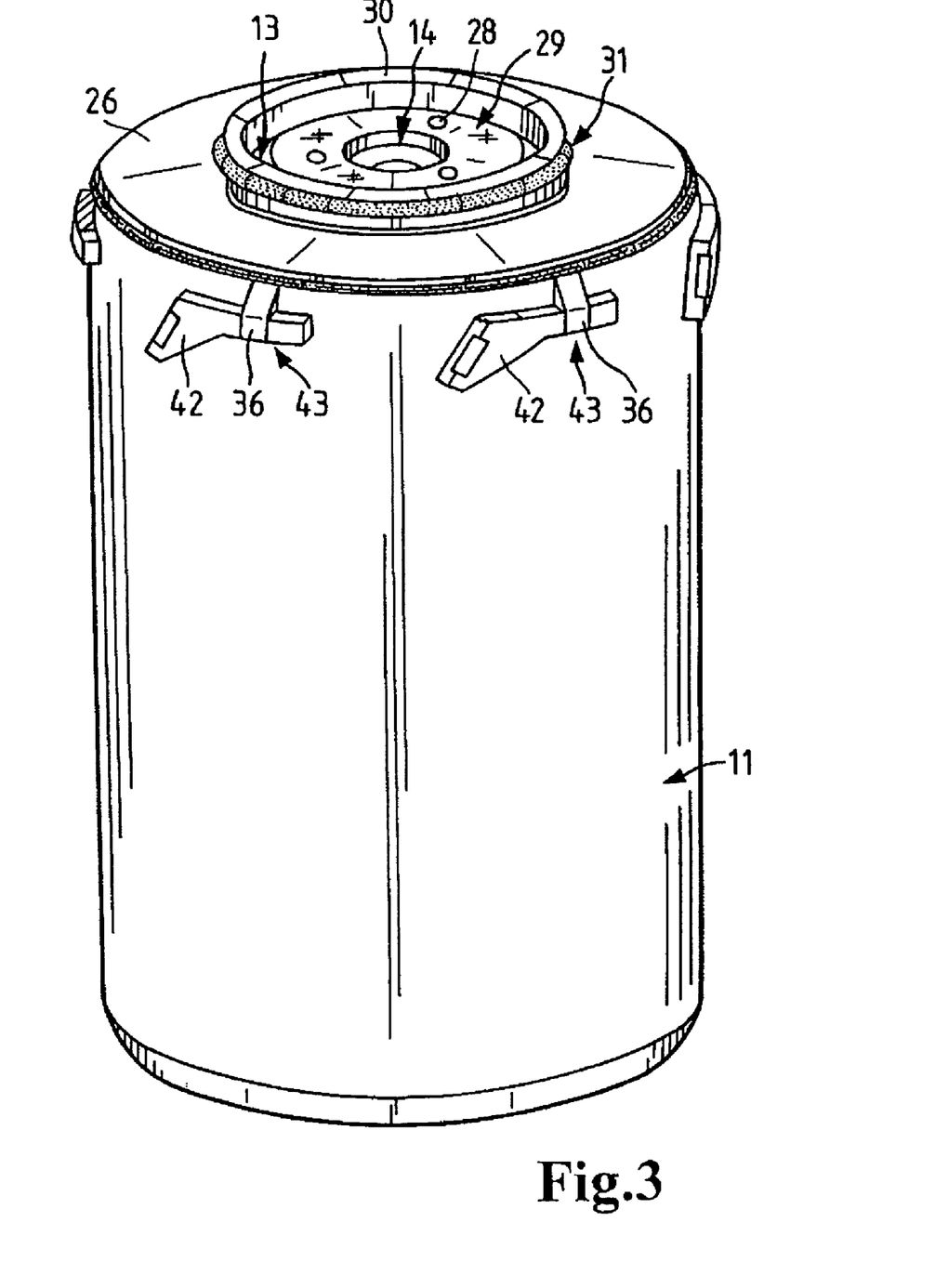
FIG. 3 is a perspective view of the filter element and the cup-shaped housing.

FIG. 3 shows a perspective view of the cup-shaped housing 11 with the filter element 15 installed in the housing. Again, components corresponding to the previous figures are identified by the same reference numerals. The multiple connecting elements 28 on the end disk 27 for the barrier membrane 29 can be seen clearly in this view. In addition, a plurality of catch contours 42 are uniformly distributed around the periphery of the open axial end of the cup-shaped housing 11 for producing the bayonet closure between the housing 11 and the connecting head 12.

When the filter element 15 is installed correctly, the catch element parts 36 on the filter element are received in the recesses 43 on the housing catch contours 42, thereby completing the catch contours 42. When a filter element 15 is not installed or when a filter element that has been installed does not fit properly, the recess 43 within the catch contour 42 remains open, so that the blocking element 39 can engage in the recess 43, thereby preventing the cup-shaped housing 11 from being rotated in relation to the connecting head 12 to form a bayonet-type connection between the housing and the connecting head.

Figure 4:
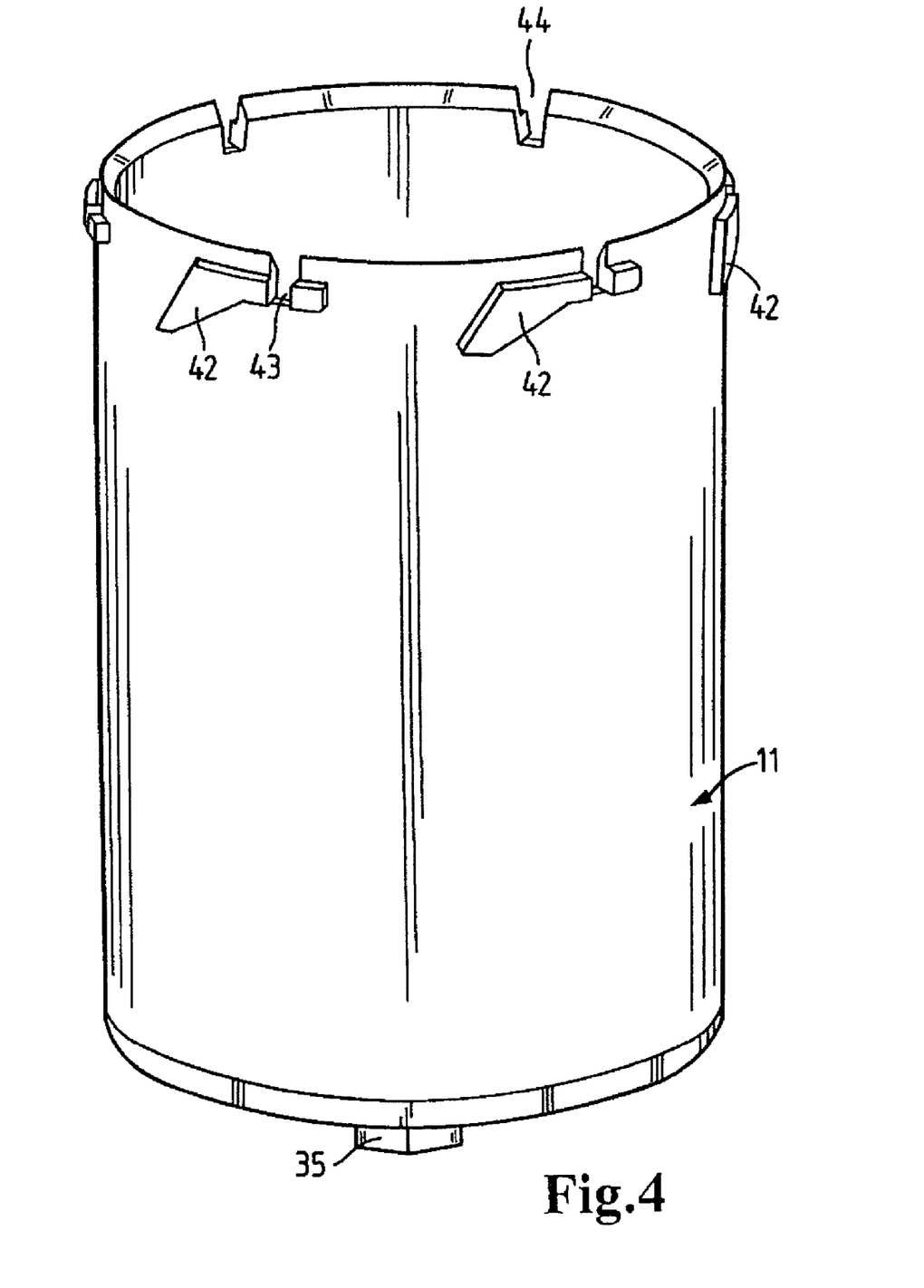
FIG. 4 is a perspective view of the cup-shaped housing.

FIG. 4 depicts the cup-shaped housing 11 in a perspective view. The cup-shaped housing 11 has recesses 44 extending axially from the open end of the cup-shaped housing 11 distributed around the circumference for insertion of the filter element 15 and ending in the recesses 43 in the catch contour. The filter element 15 with the catch element parts 36 is therefore introduced into the recess 44 and inserted to the end of the recess 43 until the catch element parts 36 complete the catch contour 42. Only in this way are the catch contours 42 completed to facilitate the connection of the housing 11 to the connecting head 12.

Figure 5:
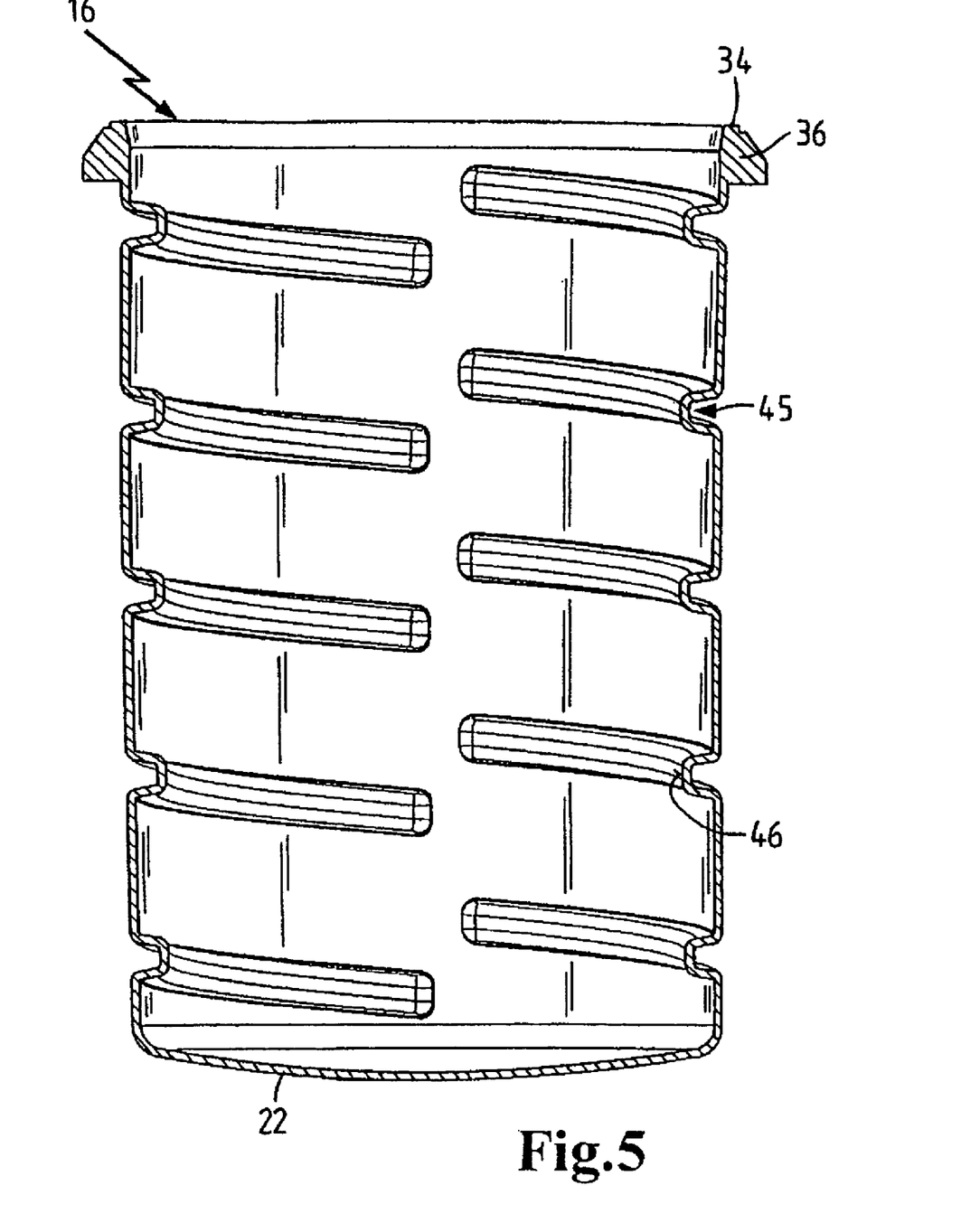
FIG. 5 is a sectional view through the outer shell or canister of the filter element.

FIG. 5 shows a section through the canister 16, which forms the outside shell of the filter element 15. A plurality of grooves 45 are distributed over the lateral surface of the canister 16, forming a contact surface 46 for the first filter bellows 19 in the interior of the canister 16. Since the grooves 45 are not arranged continuously in the inside circumference of the canister 16, this yields a simple possibility for supplying the liquid, which flows through the first filter bellows 19 after being cleaned, to the discharge chamber 40 on the clean side via the housing, i.e., the canister bottom 22.

Then the remainder of the filter element described above is inserted into the canister 16 and connected to the canister 16 on the connecting contour 34. This results in a liquid-tight system which, whenever, maintenance is required, ensures that contamination of the environment and the surroundings is prevented, as well as any soiling of the hands of the maintenance person. The axial closure of the canister 16 in the area of the open end is in turn formed by the catch element parts 36 which matingly engage in the recesses 43 of the catch contours 42 of the cup-shaped housing 11.

Figure 6:
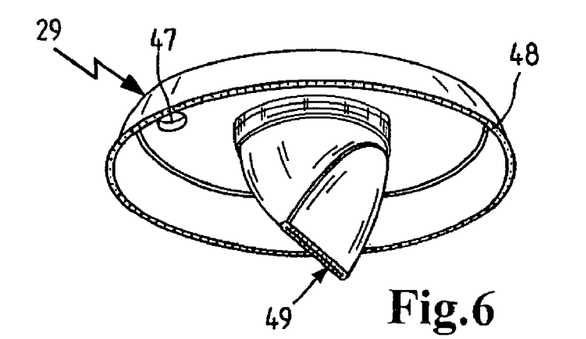
FIG. 6 is a perspective view of the barrier membrane.

FIG. 6 is a perspective view of the barrier membrane. Again, the components corresponding to the previous figures are identified by the same reference numerals. The barrier membrane is designed essentially in the form of a sheet, preferably a thermoplastic elastomer, and has a plurality of apertures 47 in the sheet-like part to establish the connection with the end disk 27 via the connecting elements 28.

The outer area of the barrier membrane 29 comprises a sealing surface 48 for the inlet area of the filter system 10. Sealing surface 48 is angled in relation to the sheet-like area, and, due to the flexibility of the material, moves away from the sealing surface of the end closure disk 26 as the liquid to be cleaned flows in, thereby ensuring admission of the liquid. When the internal combustion engine is not running, i.e., when no liquid pressure is applied to the barrier membrane, the sealing surface 48 seals the inlet 13 due to the resilience of the barrier membrane 29.

A type of sealing valve 49 is arranged concentrically in the interior of the barrier membrane in order to seal off the outlet when the filter element is removed from the liquid circuit. The outlet seal valve 49 has a duckbill configuration, which is opened by the insertion of the connecting tube 33 extending from the connecting head 12. When the outlet tube 33 is removed, the outlet seal valve 49 closes again due to its own elasticity. Thus the barrier membrane and the non-return valve are both realized in a single, one-piece component.

FIG. 7 illustrates one possibility for using the blocking element 38. Again, components corresponding to those in the previous figures are identified by the same reference numerals. FIG. 7 shows a top sectional view of a portion of the filter arrangement in the area of the blocking element 38. The blocking element 38 is arranged in the connecting head 12 and comprises a locking pin 50 and a spring 51 arranged in the connecting head 12 so that the locking pin 50 is movable axially against the force of the spring 51 and engages in the recess 43 of the catch contour 42 due to the force of the spring 51 when the cup-shaped housing 11 and the connecting head 12 are brought together if a filter element 15 is not present or is not properly installed. The engagement of the locking pin 50 in the recess 43 thereby prevents the rotation required to establish the bayonet connection between the housing 11 and the connecting head 12.

If a filter element 15 is correctly installed, the recesses 43 and 44 are filled by the catch element parts 36 of the filter element 15 to complete the catch contour 42 so that the locking pin 50 is pushed back into the connecting head 12 against the force of the spring 51, and it is therefore possible for the cup-shaped housing 11 to be rotated with respect to the connecting head 12 in order to establish a bayonet connection between the cup-shaped housing 11 and the connecting head 12.

Figure 8:
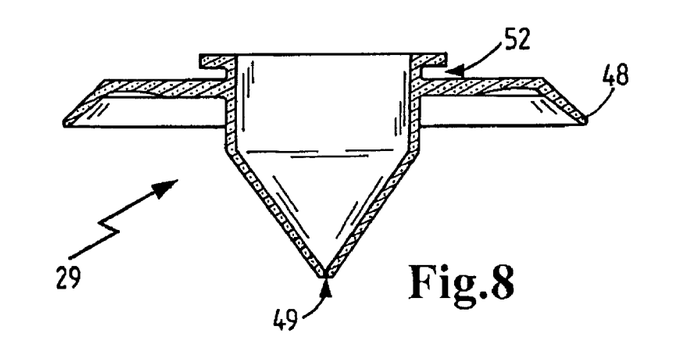
FIG. 8 is a sectional view through an alternative barrier membrane according to the invention.

FIG. 8 is a sectional view through shows a section through a barrier membrane 29 with an alternative configuration. Again, che components corresponding to those in the preceding figures are identified by the same reference numerals. The attachment to the filter element is achieved in this embodiment via an annular peripheral groove 52 arranged concentrically with the inlet sealing surface 48. Groove 52 serves to accommodate an end disk as illustrated in FIG. 9.

Figure 9:
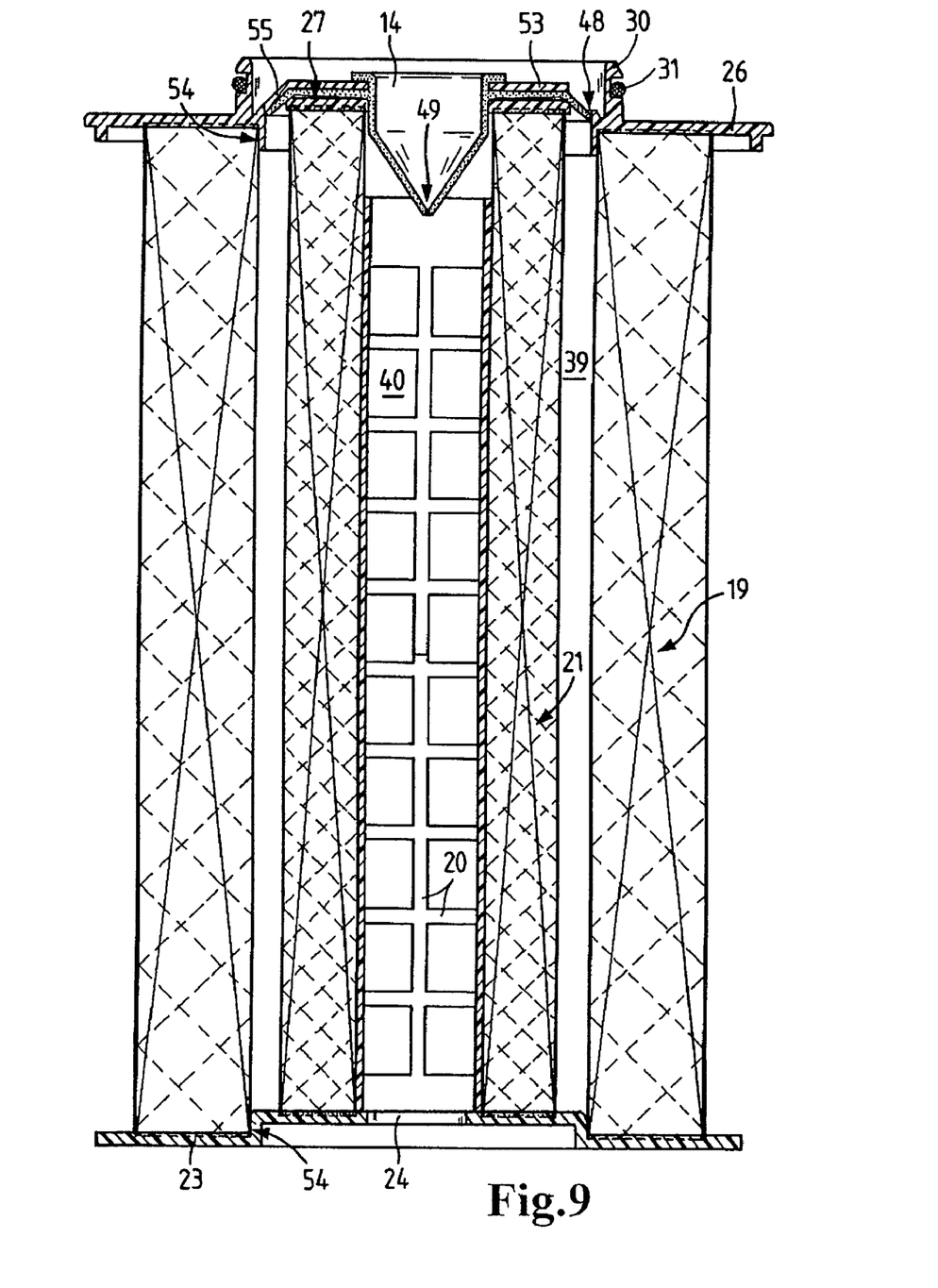
FIG. 9 is a sectional view through a part of an alternative filter element.

FIG. 9 is a sectional view through a part of an alternative filter element using the barrier membrane 29. Again, components corresponding to those in the previous figures are identified by the same reference numerals. In this embodiment, the inner filter bellows 21 is connected to the lower end disk 23 and the upper end disk 27 by butt welding or mirror welding.

The end closure disk 26 includes a concentrically arranged mounting ring 53 which is received in groove 52 to secure the barrier membrane 29 in position. Mounting ring 53 is preferably connected with the end closure disk 26 via integral connecting webs 55, which are distributed around the periphery surrounding the outlet 14. End closure disk 26 and end disk 23 each have sealing seats 54 for the outer filter bellows 19 and secure the filter bellows in position. The canister 16 (not shown here) may be constructed as described above and accordingly connects the two end disks 23 and 26.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A liquid filter comprising
a cup-shaped housing with a liquid inlet and a liquid outlet in communication with a discharge chamber of said filter;
a filter element sealingly disposed in said housing between the inlet and the outlet, and
a one-piece barrier membrane disposed adjacent the opening of the cup-shaped housing so that the liquid inlet and the liquid outlet can be closed by the barrier membrane, wherein
the barrier membrane includes a circular connecting plate having a first return flow barrier arranged on the radially outer edge thereof and a concentric second return flow barrier arranged radially inwardly thereof,
the connecting plate is provided with connecting elements for detachably connecting the barrier membrane to an end disk of the filter element or to a cover plate, and
the concentric second return flow barrier includes an outlet seal valve having a duckbill configuration, said duckbill constructed as a flexible tube continuation extending from said connecting plate into said discharge chamber, said flexible tube forming a pair of tilted, opposing, generally flat members converging to form a self-closing slit, said slit configured to sealably close said liquid outlet,
wherein curved sidewalls of said flexible tube are operable to tension said flat members to maintain closure of said slit,
wherein the duckbill is directed towards the interior of the filter element,
wherein the duckbill is configured to be mechanically opened during installation.

2. A liquid filter according to claim 1, wherein the filter element has a hollow cylindrical shape and an end disk adjacent the opening of the cup-shaped housing, and the barrier membrane is affixed to the end disk of the filter element.

3. A liquid filter according to claim 2, wherein the barrier membrane is non-detachably affixed to the end disk.

4. A liquid filter according to claim 1, wherein the barrier membrane is affixed to a cover plate of the filter housing.

5. A liquid filter according to claim 4, wherein the barrier membrane is non-detachably affixed to the cover plate.

6. A liquid filter according to claim 1, wherein the barrier membrane is affixed to a central support tube of the filter element.

7. A liquid filter according to claim 6, wherein the barrier membrane is non-detachably affixed to the support tube.

8. A liquid filter according to claim 1, wherein the barrier membrane is formed of a thermoplastic, elastomeric material.

9. A liquid filter according to claim 1, wherein the barrier membrane is made of a two-component synthetic resin material.

10. A liquid filter according to claim 1, wherein the first return flow barrier in the closed state lies in sealing contact against a concentric sealing contour arranged radially outwardly thereof.

11. A liquid filter according to claim 1, wherein said filter is a lubricating oil filter for an internal combustion engine.

12. The liquid filter of claim 1, wherein said outlet seal valve is configured to be held opened by insertion of an outlet pipe into said duckbill, thereby permitting flow through said outlet.

13. The liquid filter of claim 1, wherein said seal valve is configured and arranged such that outflow through said outlet acts to aid closure of said seal valve.

* * * * *